Patented Sept. 8, 1931

1,822,372

UNITED STATES PATENT OFFICE

MARK E. PUTNAM, OF MIDLAND, MICHIGAN, ASSIGNOR TO THE DOW CHEMICAL COMPANY, OF MIDLAND, MICHIGAN, A CORPORATION OF MICHIGAN

REMOVING VOLATILE HYDROCARBON COMPOUNDS FROM AQUEOUS HALOGEN ACIDS

No Drawing. Application filed May 27, 1929. Serial No. 366,535.

The present invention concerns the purification of aqueous halogen acids. It relates specifically to the removal therefrom of volatile hydrocarbon compounds which may be present as impurities.

Hydrogen halides produced as by-products in the halogenation of certain organic compounds are in general contaminated with volatile organic compounds. Specifically, in the chlorination of benzene for the production of chlor derivatives thereof, hydrogen chloride gas is evolved and is usually recovered as aqueous hydrochloric acid by absorption in water. The hydrogen chloride gas leaving the chlorination step is contaminated with both benzene and chlor derivatives thereof, which components of the gaseous mixture may separate out in part as an oily layer on the aqueous acid produced in the subsequent absorption step. The bulk of this oil layer so formed may be decanted but there will still remain in solution in the aqueous acid enough of the benzene and/or its chlor derivatives to make the acid unfit for certain uses in the arts, and it becomes, accordingly, desirable to provide a method of removing such impurity to fit such acid for a wider use. Such contamination will be suffered, in general, when halogenating certain organic compounds and a means of purifying the hydrogen halides or their aqueous solutions is highly desirable.

I have found that the hydrocarbon compound in such by-product aqueous acids may be largely or completely removed by filtration of the aqueous acid through a bed of granular activated charcoal.

To the accomplishment of the foregoing and related ends, the invention, then, consists of the method and steps hereinafter fully described and particularly pointed out in the claims, such description setting forth in detail several modes of carrying out the invention, such disclosed modes illustrating, however, but several of the various ways in which the principle of the invention may be used.

In carrying out my invention one mode of procedure is as follows. I provide an acid-proof container which may be of wood, stoneware, or other acid-resistant material, to contain the activated charcoal and acid, said chamber or vessel being provided preferably with a perforated false bottom or equivalent means adapted to support a bed of the charcoal together with means to admit and withdraw a current of aqueous acid. The vessel will also be provided with means permitting access for charging, and discharging the charcoal and may include further means for admitting steam thereto.

The contaminated acid is then run through the charcoal on which the hydrocarbon compound is adsorbed. A perforated plate or equivalent means may be placed upon the charcoal bed and secured in position, if necessary, should the charcoal tend to float in the aqueous acid. Fresh charcoal containing a considerable amount of gases or air will preferably be previously wet with the acid before introduction into the filter vessel or it may be wet therewith in situ. Absorption and effective purification of the acid will proceed more satisfactorily after such wetting. The filtered acid may be returned at first to the filter if of unsatisfactory purity and the rate of flow should be adjusted to insure a sufficient time of contact with the charcoal. The depth of the filter bed may vary. I have found that a contact period of one to three minutes will permit satisfactory purification in general. When the filtrate shows, by test, a satisfactory quality, it may be withdrawn, return thereof to the filter stopped and filtration continued, the so filtered acid being run to storage or packaged or otherwise used until tests for purity indicate that the activity of the charcoal has dropped to a point where the quality of the acid is no longer satisfactory. When this occurs, the acid supply is stopped, the filter is drained, the charcoal is washed with water to remove the acid and is then reactivated by contact with steam. The washing and reactivation may be done in situ or the charge may be removed from the filter vessel for such treatment. The volatile hydrocarbons adsorbed on the charcoal are volatilized and driven off with the steam and may be recovered, if desired, in any convenient manner. When a charge of charcoal, after a period of alternate use and reactivation no longer responds satisfactorily to such reactivation, it may be withdrawn and a fresh charge substituted.

In order to enable continuous working on a commercial scale, two or more filter units may be provided, through which the acid to be purified may be run either in parallel or in series. Operation in series will better insure that the final product will at all times have the maximum degree of purity attainable. Connections may be arranged between filter units so that the filter containing the freshly activated or new charcoal will be the last in the series from which the acid exits. Experiments with the aqueous hydrochloric acid by-product obtained as described and have found that filtration through activated charcoal beds having as little depth as 4 to 10 inches will permit removal of nearly all of the contaminating hydrocarbon compounds in a single pass and that such charcoal bed may be readily washed with water and reactivated in situ with a current of steam. I have found further that such results are obtainable over a wide range of rate of working and that upwards of 80 to 90% of the original hydrocarbon compound impurity may be removed thereby in a single filtration step. As an instance of the rate of flow permissible through a bed of granular activated charcoal 10 inches deep, I have found a variation of from 1/3 to 4 liters per minute per square inch of filter bed area permissible. With a more shallow bed, the rate of flow would be reduced since it is apparent that time of contact is a factor and I have found such to be the case.

Reactivation may be accomplished in various ways which will remove the volatile adsorbed hydrocarbons from the charcoal. Among such ways may be mentioned subjecting the spent charcoal to heat, as in a heated vessel, a current of hot air or gas or steam, under pressure above or below atmospheric pressure. The manner of reactivation is not an essential feature of my invention. Subjecting the spent charcoal to a current of steam is a convenient mode of procedure.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. The method of preparing a purified hydrogen halide solution which comprises contacting an aqueous solution of a hydrogen halide resulting from the halogenation of an organic compound with a body of activated charcoal, whereby organic impurities therein are adsorbed on such charcoal.

2. The method of preparing a purified hydrochloric acid solution which comprises contacting an aqueous solution thereof resulting from the chlorination of an organic compound with a body of activated charcoal, whereby organic impurities contained therein are adsorbed on such charcoal.

3. The method of preparing a purified hydrogen halide solution which comprises causing an aqueous solution of a hydrogen halide resulting from the halogenation of an organic compound to flow through a filter bed of activated charcoal, whereby organic impurities therein are adsorbed on such charcoal.

4. The method of preparing a purified hydrochloric acid solution which comprises causing an aqueous solution thereof resulting from the chlorination of an organic compound to flow through a filter bed of activated charcoal, whereby organic impurities contained therein are adsorbed on such charcoal.

Signed by me this 23d day of May, 1929.

MARK E. PUTNAM.